United States Patent [19]

Sanchika et al.

[11] Patent Number: 5,872,191

[45] Date of Patent: Feb. 16, 1999

[54] PROCESS FOR PRODUCING A POLYOXYALKYLENE DERIVATIVES SUBSTITUTED WITH SUCCINIMIDYL GROUP

[75] Inventors: Kouzoh Sanchika; Tohru Yasukohchi; Kei-ichi Maruyama, all of Kawasaki; Syunsuke Ohhashi, Yokohama, all of Japan

[73] Assignee: NOF Corporation, Tokyo, Japan

[21] Appl. No.: 867,985

[22] Filed: Jun. 3, 1997

[30] Foreign Application Priority Data

Nov. 5, 1996 [JP] Japan ................................. 8-308784

[51] Int. Cl.$^6$ ............................ C08G 65/32; C08L 71/02
[52] U.S. Cl. .......................... 525/403; 525/408; 548/435; 548/465; 548/475; 548/520; 548/542; 546/208; 546/243
[58] Field of Search ..................... 525/403, 408; 548/435, 465, 475, 520, 542; 546/208, 243

[56] References Cited

U.S. PATENT DOCUMENTS 4,670,417  6/1987  Iwasaki et al. ............................. 514/6
5,532,150  7/1996  Snow et al. .............................. 435/188

FOREIGN PATENT DOCUMENTS 0 206 448  12/1986  European Pat. Off. .
63-060938   3/1988  Japan .
8-092068    4/1996  Japan .

Primary Examiner—Frederick Krass
Attorney, Agent, or Firm—Young & Thompson

[57] ABSTRACT

A process for producing a polyoxyalkylene derivative substituted with succinimidyl group which comprises reacting a polyoxyalkylene compound having carboxyl group at ends with N-hydroxysuccinimide in an inert solvent in the presence of dicyclohexylcarbodiimide; dissolving an obtained reaction product into chloroform, an amount by weight of chloroform being 0.5 to 10 times as much as an amount by weight of the polyoxyalkylene compound having carboxyl group at ends; and crystallizing the polyoxyalkylene derivative substituted with succinimidyl group by adding an aliphatic hydrocarbon having 5 to 8 carbon atoms to a resultant solution, an amount by weight of the aliphatic hydrocarbon being 2 to 10 times as much as an amount by weight of chloroform. Materials can be handled with safety, and a highly pure polyoxyalkylene derivative substituted with succinimidyl group which does not cause turbidity in an aqueous solution and has an excellent quality as a material for drugs can be produced.

4 Claims, 1 Drawing Sheet

PROCESS FOR PRODUCING A POLYOXYALKYLENE DERIVATIVES SUBSTITUTED WITH SUCCINIMIDYL GROUP

FIELD OF THE INVENTION

The present invention relates to a process for producing a polyoxyalkylene derivative substituted with succinimidyl group. More particularly, the present invention relates to a process for producing a highly pure polyoxyalkylene derivative substituted with succinimidyl group which is mainly used for drugs, for example, for modification of polypeptides, physiologically active proteins, and enzymes with polyoxyalkylene groups, and modification with polyoxyalkylene groups in drug delivery systems using liposomes and polymer micells.

BACKGROUND OF THE INVENTION

In recent years, many attempts have been made for stabilizing drugs by chemical modification of physiologically active proteins and enzymes. Among these attempts, chemical modification with a polyoxyalkylene derivative has long been made, and polyoxyalkylene derivatives having carboxyl group at the end of the molecule are known as typical examples of such a polyoxyalkylene derivative.

It is already disclosed that polyoxyalkylene compounds having carboxyl group at the end can generally be transformed into an activated polyoxyalkylene derivative substituted with succinimidyl group by the reaction with N-hydroxysuccinimide in the presence of dicyclohexylcarbodiimide to increase the reactivity with substances for the modification such as physiologically active proteins (the specifications of Japanese Patent Application Laid-Open No. Showa 62(1987)-185029, Japanese Patent Application Laid-Open No. Showa 63(1988)-60938, and Japanese Patent Application Laid-Open No. Heisei 4(1992)-164098).

Heretofore, for preparation of a polyoxyalkylene derivative substituted with succinimidyl group, a polyoxyalkylene compound having carboxyl group at the end is brought into reaction with N-hydroxysuccinimide in an inert solvent such as dimethylformamide in the presence of dicyclohexylcarbodiimide. After the reaction has been completed, formed dicyclohexylurea is removed by filtration, and the filtrate is added into ethyl ether or petroleum ether dropwise to precipitate the polyoxyalkylene derivative substituted with succinimidyl group as the product (for example, the specification of Japanese Patent Application Laid-Open No. Showa 62(1987)-89630, and A. Abuchowski et al., Cancer Biochem. Biophys. Volume 7, Pages 175 to 186, published in 1984).

In recent years, it has been required that polyoxyalkylene derivatives used for chemical modification of physiologically active proteins or drug delivery systems using liposome be produced in a controlled environment such as a clean room. In the production of polyoxyalkylene derivatives substituted with succinimidyl group, using a large amount of an ether in the crystallization process is not preferable in view of handling because ethyl ether and petroleum ether which have heretofore been used are volatile and there is the possibility of inflammation. When the precipitation is conducted by using petroleum ether, complete removal of dicyclohexylurea formed from dicyclohexylcarbodiimide during the reaction is sometimes difficult. When dicyclohexylurea is left remaining in the polyoxyalkylene derivative substituted with succinimidyl group, an aqueous solution of the derivative becomes turbid, and using such a derivative as a raw material for drugs is not desirable.

SUMMARY OF THE INVENTION

Accordingly, the present invention has an object of providing a process for producing a highly pure polyoxyalkylene derivative substituted with succinimidyl group which enables handling of materials with safety and provides the polyoxyalkylene derivative not causing turbidity in an aqueous solution and having an excellent quality as a material for drugs.

As the result of the extensive studies conducted by the present inventors to solve the above problems, it was discovered that dicyclohexylurea can effectively be removed by reacting a polyoxyalkylene compound having carboxyl group at the end with N-hydroxysuccinimide in the presence of dicyclohexylcarbodiimide, dissolving the obtained reaction product in cloroform, and crystallizing the reaction product by adding an aliphatic hydrocarbon having 5 to 8 carbon atoms to the resultant solution. The present invention has been completed on the basis of the discovery.

Thus, the present invention provides:

(1) A process for producing a polyoxyalkylene derivative substituted with succinimidyl group which is represented by general formula [2]:

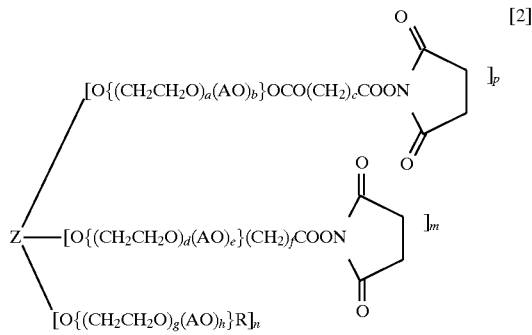

(wherein Z represents a residue derived from a compound having 2 to 4 hydroxyl groups; R represents hydrogen atom or a hydrocarbon group having 1 to 24 carbon atoms; AO represents an oxyalkylene group having 3 or 4 carbon atoms; a, d and g represent each an average number by mol of addition of oxyethylene group which is 0 to 1,000, and a+d+g=30 to 1,000; b, e, and h represent each an average number by mol of addition of oxyalkylene group which is 0 to 200; (b+e+h)/(a+d+g)=0 to 0.2; the oxyethylene groups and the oxyalkylene groups are added to each other randomly or to form blocks; c represents 1 to 4; f represents 1 to 3; p represents 0 to 4; m represents 0 to 4; n represents 0 to 3; p and m do not simultaneously represent 0; and p+m+n=2 to 4) which comprises reacting a polyoxyalkylene compound having carboxyl group at ends which is represented by general formula [1]:

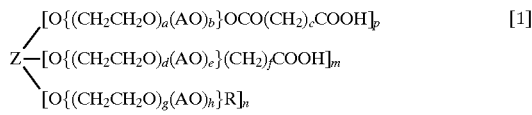

(wherein Z represents a residue derived from a compound having 2 to 4 hydroxyl groups; R represents hydrogen atom or a hydrocarbon group having 1 to 24 carbon atoms; AO represents an oxyalkylene group having 3 or 4 carbon atoms; a, d and g represent each an average number by mol of addition of oxyethylene group which is 0 to 1,000, and a+d+g=30 to 1,000; b, e, and h represent each an average number by mol of addition of oxyalkylene group which is 0 to 200; (b+e+h)/(a+d+g)=0 to 0.2; the oxyethylene groups and the oxyalkylene groups are added to each other randomly or to form blocks; c represents 1 to 4; f represents 1 to 3; p represents 0 to 4; m represents 0 to 4; n represents 0 to 3; p and m do not simultaneously represent 0; and p+m+n=2 to 4) with N-hydroxysuccinimide in an inert solvent in the presence of dicyclohexylcarbodiimide; dissolving an obtained reaction product into chloroform, an amount by weight of chloroform being 0.5 to 10 times as much as an amount by weight of the compound represented by general formula [1]; and crystallizing the compound represented by general formula [2] by adding an aliphatic hydrocarbon having 5 to 8 carbon atoms to a resultant solution, an amount by weight of the aliphatic hydrocarbon being 2 to 10 times as much as an amount by weight of chloroform;

(2) A process according to claim 1, wherein the obtained reaction product is dissolved into a mixed solvent comprising chloroform and toluene, an amount by weight of chloroform being 0.5 to 10 times as much as an amount by weight of the compound represented by general formula [1], and an amount by weight of toluene being 1 to 20 times as much as an amount by weight of the compound represented by general formula [1]; and the compound represented by general formula [2] is crystallized by adding an aliphatic hydrocarbon having 5 to 8 carbon atoms to a resultant solution, an amount by weight of the aliphatic hydrocarbon being 2 to 10 times as much as an amount by weight of chloroform;

(3) A process according to claim 1, wherein the obtained reaction product is dissolved into chloroform, an amount by weight of chloroform being 1 to 3 times as much as an amount by weight of the compound represented by general formula [1]; and the compound represented by general formula [2] is crystallized by adding hexane to a resultant solution, an amount by weight of hexane being 2.5 to 5 times as much as an amount by weight of chloroform; and (4) A process according to claim 1, wherein the obtained reaction product is dissolved into a mixed solvent comprising chloroform and toluene, an amount by weight of chloroform being 1 to 3 times as much as an amount by weight of the compound represented by general formula [1], and an amount by weight of toluene being 2 to 5 times as much as an amount by weight of the compound represented by general formula [1]; and the compound represented by general formula [2] is crystallized by adding hexane to a resultant solution, the amount by weight of hexane being 2.5 to 5 times as much as an amount by weight of chloroform.

DETAILED DESCRIPTION OF THE INVENTION

Figure 1:
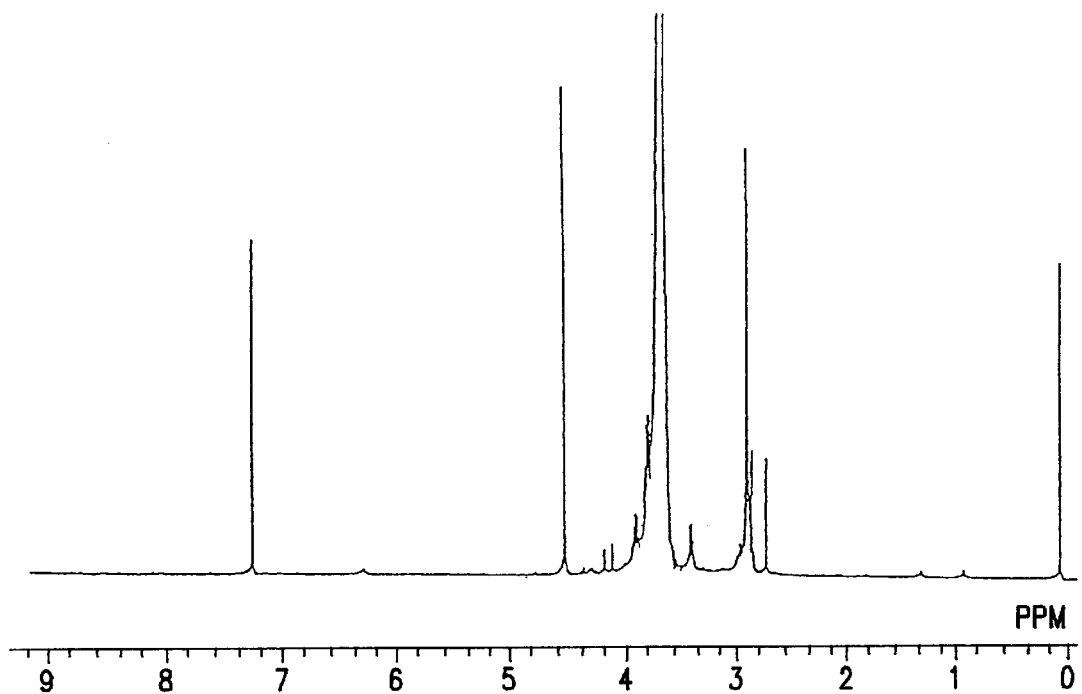
FIG. 1 shows the $^1$H-NMR spectrum of a polyoxyethylene derivative substituted with succinimidyl group which was prepared in accordance with the process of the present invention.

In the present invention, a polyoxyalkylene compound having carboxyl group at the end which is represented by general formula [1]:

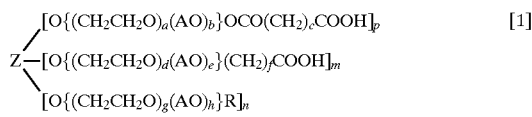

is used as the starting material. In general formula [1], Z represents a residue group derived from a compound having 2 to 4 hydroxyl groups; R represents hydrogen atom or a hydrocarbon group having 1 to 24 carbon atoms; AO represents an oxyalkylene group having 3 or 4 carbon atoms; a, d and g represent each the average number by mol of addition of oxyethylene group which is 0 to 1,000, and a+d+g=30 to 1,000; b, e, and h represent each the average number by mol of addition of oxyalkylene group which is 0 to 200; (b+e+h)/(a+d+g)=0 to 0.2; the oxyethylene groups and the oxyalkylene groups are added to each other randomly or to form blocks; c represents 1 to 4; f represents 1 to 3; p represents 0 to 4; m represents 0 to 4; n represents 0 to 3; p and m do not simultaneously represent 0; and p+m+n=2 to 4.

Examples of the compound having 2 to 4 hydroxyl groups which provides the residue group represented by Z in general formula [1] include ethylene glycol, propylene glycol, 1,2-butylene glycol, 1,3-butylene glycol, 2,3-butylene glycol, tetramethylene glycol, glycerol, diglycerol, erythritol, 1,3,5-pentanetriol, trimethylolethane, trimethylolpropane, and pentaerythritol.

Examples of the hydrocarbon group having 1 to 24 carbon atoms which is represented by R in general formula [1] include saturated or unsaturated linear or branched aliphatic hydrocarbon groups, such as methyl group, ethyl group, propyl group, isopropyl group, butyl group, isobutyl group, tertiary-butyl group, pentyl group, isopentyl group, hexyl group, isoheptyl group, 2-ethylhexyl group, octyl group, isononyl group, decyl group, dodecyl group, isotridecyl group, tetradecyl group, hexadecyl group, octadecyl group, isostearyl group, oleyl group, octyldodecyl group, docosyl group, and decyltetradecyl group; and aromatic hydrocarbon groups, such as benzyl group, cresyl group, butylphenyl group, dibutylphenyl group, octylphenyl group, nonylphenyl group, dodecylphenyl group, dioctylphenyl group, and dinonylphenyl group. Among these groups, methyl group, ethyl group, and propyl group are particularly preferable.

Examples of the oxyalkylene group having 3 or 4 carbon atoms which is represented by AO in general formula [1] include oxypropylene group, oxybutylene group, and oxytetramethylene group. These oxyalkylene groups can be formed by addition polymerization of propylene oxide, 1,2-butylene oxide, or tetrahydrofuran.

In general formula [1], a, d, and g represent each the average number of addition of oxyethylene group. a, d, and g represent each 0 to 1,000, and the total of a, d, and g is 30 to 1,000. When the total of a, d, and g is less than 30, there is the possibility that forming precipitates is difficult in the crystallization. When the total of a, d, and g is more than 1,000, there is the possibility that the viscosity is excessively high to cause inferior workability.

In general formula [1], b, e, and h represent each the average number of addition of an oxyalkylene group having 3 or 4 carbon atoms. b, e, and g represent each 0 to 200. The ratio (b+e+h)/(a+d+g) which is the ratio of the number of addition of the oxyalkylene group having 3 or 4 carbon atoms to the number of addition of oxyethylene group is 0 to 0.2. When the ratio of the number of addition of the oxyalkylene group having 3 or 4 carbon atoms to the number of addition of oxyethylene group is more than 0.2, the polyoxyalkylene derivative substituted with succinimidyl group tends to be liquid to cause difficulty in forming precipitates in the crystallization.

In general formula [1], c and f represent each the number of methylene group. c represents 1 to 4, and f represents 1 to 3. Either when c represents 5 or more or when f represents 4 or more, the raw material is difficult to obtain.

In general formula [1], p, m, and n represent each the number of the functional group at the end in the residue group represented by Z which is derived from the compound having hydroxyl groups. p represents 0 to 4, m represents 0 to 4, and n represents 0 to 3. p+m+n is 2 to 4. In general formula [1], p and m do not simultaneously represent 0, i.e., the compound represented by general formula [1] has at least one carboxyl group.

In the process of the present invention, the polyoxyalkylene compound having carboxyl group at the end which is represented by general formula [1] is brought into reaction with N-hydroxysuccinimide in an inert solvent in the presence of dicyclohexylcarbodiimide to synthesize the polyalkylene derivative substituted with succinimidyl group which is represented by general formula [2]:

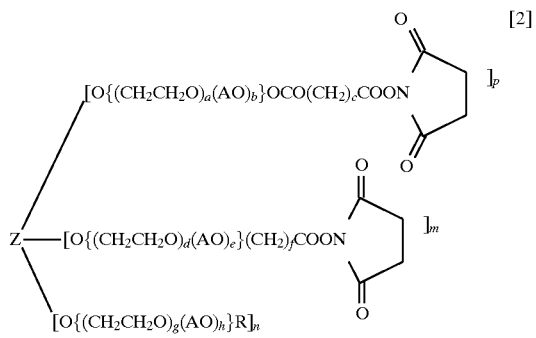

In general formula [2], Z represents a residue group derived from a compound having 2 to 4 hydroxyl groups; R represents hydrogen atom or a hydrocarbon group having 1 to 24 carbon atoms; AO represents an oxyalkylene group having 3 or 4 carbon atoms; a, d and g represent each the average number by mol of addition of oxyethylene group which is 0 to 1,000, and a+d+g=30 to 1,000; b, e, and h represent each the average number by mol of addition of oxyalkylene group which is 0 to 200; (b+e+h)/(a+d+g)=0 to 0.2; the oxyethylene groups and the oxyalkylene groups are added to each other randomly or to form blocks; c represents 1 to 4; f represents 1 to 3; p represents 0 to 4; m represents 0 to 4; n represents 0 to 3; p and m do not simultaneously represent 0; and p+m+n=2 to 4.

In the process of the present invention, any type of solvent can be used as the inert solvent in the reaction of the compound represented by general formula [1] with N-hydroxysuccinimide without any restriction as long as the solvent has neither hydroxyl group nor carboxyl group. Examples of such an inert solvent include chloroform, acetonitrile, dichloromethane, toluene, acetone, tetrahydrofuran, 1,1-dichloroethane, and benzene. Among these solvents, chloroform, dichloromethane, and toluene are particularly preferably used. A solvent having hydroxyl group such as methanol reacts with the carboxyl group at the end of the polyoxyalkylene compound in competition with N-hydroxysuccinimide. When a compound having carboxyl group such as acetic acid is used as the solvent, the solvent reacts with N-hydroxysuccinimide in competition with the carboxyl group at the end of the polyoxyalkylene compound. Therefore, such compounds are not preferable.

In the process of the present invention, the amount by mol of N-hydroxysuccinimide which is used for the reaction with the compound represented by general formula [1] is preferably 1.0 to 2.0 times, more preferably 1.2 to 1.7 times, as much as the amount by mol of the carboxyl group in the compound represented by general formula [1]. When the amount by mol of N-hydroxysuccinimide is less than the amount by mol of the carboxyl group in the compound represented by general formula [1], unreacted carboxyl group which is not substituted with N-succinimidyl group is left remaining. When the amount by mol of N-hydroxysuccinimide is more than 2.0 times as much as the amount by mol of the carboxyl group in the compound represented by general formula [1], the amount of N-hydroxysuccinimide which does not take part in the reaction is increased, and the process is economically disadvantageous. Moreover, the complete removal of N-hydroxysuccinimide by the crystallization becomes difficult, and there is the possibility that the purity of the polyoxyalkylene derivative substituted with succinimidyl group is decreased.

In the process of the present invention, the amount by mol of dicyclohexylcarbodiimide which is present in the reaction of the compound represented by general formula [1] and N-hydroxysuccinimide is preferably 1.0 to 2.0 times, more preferably 1.2 to 1.7 times, as much as the amount by mol of the carboxyl group in the compound represented by general formula [1]. When the amount by mol of dicyclohexylcarbodiimide is less than the amount by mol of the carboxyl group in the compound represented by general formula [1], there is the possibility that the reaction does not proceed sufficiently. When the amount by mol of dicyclohexylcarbodiimide is more than 2.0 times as much as the amount by mol of the carboxyl group in the compound represented by general formula [1], the amount of dicyclohexylcarbodiimide is excessively large, and the process is economically disadvantageous. Moreover, the complete removal of the unreacted dicyclohexylcarbodiimide by the crystallization becomes difficult, and there is the possibility that the purity of the polyoxyalkylene derivative substituted with succinimidyl group is decreased.

In the process of the present invention, the temperature of the reaction of the compound represented by general formula [1] with N-hydroxysuccinimide is preferably 5° to 40° C., more preferably 15° to 35° C. When the temperature of the reaction is lower than 5° C., the reaction is slow. Therefore, a long time is required for the reaction, and there is the possibility that the conversion of the reaction is not increased sufficiently. When the temperature of the reaction is higher than 40° C., there is the possibility that undesirable side reactions, such as decomposition of succinimidyl group, take place. The time of the reaction of the compound represented by general formula [1] with N-hydroxysuccinimide is preferably 2 to 30 hours, more preferably 5 to 24 hours. When the time of the reaction is less than 2 hours, the reaction of the carboxyl group at the end of the compound represented by general formula [1] with N-hydroxysuccinimide does not sufficiently proceed, and there is the possibility that unreacted carboxyl group is left remaining. As the time of the reaction, 30 hours are generally sufficient. When the reaction is continued for more than 30 hours, there is the possibility that undesirable side reactions, such as decomposition of succinimidyl group, take place.

In the process of the present invention, it is preferred that a pretreatment is conducted before the crystallization. (1) When the solvent used for the reaction is chloroform, (i) a pretreatment in which the reaction product is filtered to remove impurities insoluble in the solvent used for the reaction, and a chloroform solution is prepared; (ii) a pretreatment in which toluene is added to the reaction product after the reaction product has been filtered to prepare a solution in a mixed solvent; or (iii) a pretreatment in which toluene is added to the reaction product to form a mixed solvent, and the reaction product is then filtered to prepare a solution in a mixed solvent, may be conducted. (iv) A pretreatment in which the solvent used for the reaction is removed, the obtained product is dissolved in toluene, the resultant toluene solution is filtered, and chloroform is added to the obtained toluene solution to prepare a solution in a mixed solvent, may also be conducted. For removing dicyclohexylcarbodiimide, the pretreatment in which the solvent for the reaction is removed, the obtained product is dissolved in toluene, the resultant toluene solution is filtered, and chloroform is added to the obtained toluene solution to prepare a solution in a mixed solvent, is preferred.

(2) When the solvent used for the reaction is toluene, a pretreatment in which the reaction solution is filtered to remove impurities insoluble in the solvent used for the reaction, and chloroform is added to the filtrate to prepare a solution in a mixed solvent; or a pretreatment in which the solvent used for the reaction is removed, the resultant product is dissolved in chloroform, and the obtained solution is filtered to prepare a chloroform solution, wherein the reaction solution is filtered or not filtered before the solvent used for the reaction is removed, may be conducted.

(3) When the solvent used for the reaction is a solvent different from chloroform or toluene, a pretreatment in which the solvent used for the reaction is removed from the reaction solution after the reaction solution is filtered to remove impurities insoluble in the solvent, and the obtained product is dissolved in chloroform to prepare a chloroform solution or in a mixed solvent containing chloroform and toluene to prepare a solution in a mixed solvent; or a pretreatment in which the solvent used for the reaction is removed, the obtained product is dissolved in toluene, the obtained toluene solution is filtered, and chloroform is added to the filtrate to prepare a solution in a mixed solvent, wherein the reaction solution is filtered or not filtered before the solvent used for the reaction is removed, may be conducted.

When the solvent used for the reaction is removed, it is preferred that the solvent is removed at 60° C. or lower and, where necessary, under a reduced pressure. When the temperature for removing the solvent is higher than 60° C., there is the possibility that undesirable reactions such as decomposition of succinimidyl group take place. The material of the filter used for the filtration is not particularly limited as long as crystal of dicyclohexylurea which is hardly soluble in the solvent used for the reaction can be removed. In general, filters which retain particles having diameters of 1 to 10 $\mu$m, have resistance to the solvent, and are made of various materials, such as paper and glass, can be used. The method of the filtration is not particularly limited, and various methods, such as filtration under an added pressure or under a reduced pressure and centrifugal filtration, can be used.

In the process of the present invention, after dicyclohexylurea in the reaction mixture is removed in advance as described above, the crystallization is conducted by adding an aliphatic hydrocarbon having 5 to 8 carbon atoms to the chloroform solution of the reaction product containing the polyoxyalkylene derivative substituted with succinimidyl group which is represented by general formula [2] as the main component to remove small amounts of impurities, such as dicyclohexylurea, which is still remaining in the reaction product. The amount by weight of chloroform used for dissolving the reaction product is 0.5 to 10 times, preferably 1 to 3 times, as much as the amount by weight of the compound represented by general formula [1]. When the amount by weight of chloroform is less than 0.5 times as much as the amount by weight of the compound represented by general formula [1], there is the possibility that the removal of dicyclohexylurea remaining in a small amount is insufficient. When the amount by weight of chloroform is more than 10 time as much as the amount by weight of the compound represented by general formula [1], there is the possibility that the yield of the polyoxyalkylene derivative substituted with succinimidyl group is decreased.

The aliphatic hydrocarbon having 5 to 8 carbon atoms which is added to the chloroform solution of the reaction product is not particularly limited. Examples of the aliphatic hydrocarbon having 5 to 8 carbon atoms include pentane, isopentane, neopentane, hexane, isohexane, 3-methylpentane, neohexane, 2,3-dimethylbutane, heptane, 2-methylhexane, 3-methylhexane, 3-ethylpentane, 2,2-dimethylpentane, 2,3-dimethylpentane, 2,4-dimethylpentane, 3,3-dimethylpentane, 2,3,3-trimethylbutane, octane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2-methyl-3-ethylpentane, 3-methyl-3-ethylpentane, 2,2,3-trimethylpentane, 2,2,4-trimethylpentane, 2,3,3-trimethylpentane, 2,3,4-trimethylpentane, and 2,2,3,3-tetramethylbutane. Among these hydrocarbons, hexane and heptane are particularly preferably used.

The amount by weight of the aliphatic hydrocarbon having 5 to 8 carbon atoms which is added to the chloroform solution of the reaction product is 2 to 10 times, preferably 2.5 to 5 times, as much as the amount by weight of chloroform. When the amount by weight of the aliphatic hydrocarbon having 5 to 8 carbon atoms is less than 2 times as much as the amount by weight of chloroform, there is the possibility that the compound represented by general formula [2] is not sufficiently precipitated and left remaining in the solution. When the amount by weight of the aliphatic hydrocarbon having 5 to 8 carbon atoms is more than 10 times as much as the amount by weight of chloroform, there is the possibility that dicyclohexylurea which is left remaining in the solution in a small amount is precipitated to cause decrease in the purity of the polyoxyalkylene derivative substituted with succinimidyl group.

In the process of the present invention, the aliphatic hydrocarbon having 5 to 8 carbon atoms is slowly added to the chloroform solution of the reaction product while the solution is stirred, and the compound represented by general formula [2] is precipitated. After the addition has been completed, the solution is stirred for 1 to 2 hours, and the compound represented by general formula [2] which has been precipitated is separated by filtration under an increased pressure or under a reduced pressure, or by centrifugal filtration. The separated compound represented by general formula [2] is preferably washed with the aliphatic hydrocarbon having 5 to 8 carbon atoms in an amount by weight 5 to 10 times as much as the amount by weight of the compound represented by general formula [1]. The compound represented by general formula [2] which has been separated and washed is preferably dried in vacuo at 20° to 35° C. for 10 to 20 hours.

In the process of the present invention, the crystallization by addition of the aliphatic hydrocarbon having 5 to 8 carbon atoms to the chloroform solution of the reaction product may be conducted only once or repeatedly. For the repeated crystallization, the compound represented by general formula [2] which has been precipitated by crystallization is dissolved into chloroform again, and the compound represented by general formula [2] is crystallized again from the obtained chloroform solution. The purity of the polyoxyalkylene derivative substituted with succinimidyl group is increased by the repeated crystallization. Therefore, the number of repeating of the crystallization can suitably be selected in accordance with the required purity of the polyoxyalkylene derivative substituted with succinimidyl group.

In the process of the present invention, the reaction product can also be dissolved into a mixed solvent containing chloroform and toluene, and the compound represented by general formula [2] can be crystallized from the obtained solution by adding an aliphatic hydrocarbon having 5 to 8 carbon atoms. When the reaction product is dissolved into a mixed solvent containing chloroform and toluene, the amount by weight of chloroform is preferably 0.5 to 10 times, more preferably 1 to 3 times, as much as the amount by weight of the compound represented by general formula [1]. When the amount by weight of chloroform is less than 0.5 times as much as the amount by weight of the compound represented by general formula [1], there is the possibility that the removal of dicyclohexylurea which is left remaining in a small amount is insufficient. When the amount by weight of chloroform is more than 10 times as much as the amount by weight of the compound represented by general formula [1], there is the possibility that the yield of the polyoxyalkylene derivative substituted with succinimidyl group is decreased.

When the reaction product is dissolved in a mixed solvent containing chloroform and toluene, the amount by weight of toluene is preferably 1 to 20 times, more preferably 2 to 5 times, as much as the amount by weight of the compound represented by general formula [1]. When the amount by weight of toluene is less than the amount by weight of the compound represented by general formula [1], there is the possibility that the removal of dicyclohexylurea which is left remaining in a small amount is insufficient. When the amount by weight of toluene is more than 20 times as much as the amount by weight of the compound represented by general formula [1], there is the possibility that the yield of the polyoxyalkylene derivative substituted with succinimidyl group is decreased.

In the process of the present invention, when the compound represented by general formula [2] is crystallized by adding an aliphatic hydrocarbon having 5 to 8 carbon atoms to a solution of the reaction product in a mixed solvent containing chloroform and toluene, the amount by weight of the aliphatic hydrocarbon having 5 to 8 carbon atoms which is added to the solution of the reaction product in the mixed solvent containing chloroform and toluene is preferably 2 to 10 times, more preferably 2.5 to 5 times, as much as the amount by weight of chloroform. When the amount by weight of the aliphatic hydrocarbon having 5 to 8 carbon atoms is less than 2 times as much as the amount by weight of chloroform, there is the possibility that the compound represented by general formula [2] is not precipitated sufficiently and left remaining in the solution. When the amount by weight of the aliphatic hydrocarbon having 5 to 8 carbon atoms is more than 10 times as much as the amount by weight of chloroform, there is the possibility that dicyclohexylurea which is left remaining in the solution in a small amount is precipitated to cause decrease in the purity of the polyoxyalkylene derivative substituted with succinimidyl group.

In the process of the present invention, the aliphatic hydrocarbon having 5 to 8 carbon atoms is slowly added to the solution of the reaction product in a mixed solvent containing chloroform and toluene while the solution is stirred, and the compound represented by general formula [2] is precipitated. After the addition has been completed, the solution is stirred for 1 to 2 hours, and the compound represented by general formula [2]which has been precipitated is separated by filtration under an increased pressure or under a reduced pressure, or by centrifugal filtration. The separated compound represented by general formula [2] is preferably washed with the hydrocarbon having 5 to 8 carbon atoms in an amount by weight 3 to 10 times as much as the amount by weight of the compound represented by general formula [1]. The compound represented by general formula [2] which has been separated and washed is preferably dried in vacuo at 20° to 35° C. for 10 to 20 hours.

In the process of the present invention, the crystallization by addition of the aliphatic hydrocarbon having 5 to 8 carbon atoms to the solution of the reaction product in a mixed solvent containing chloroform and toluene can be conducted only once or repeatedly. For the repeated crystallization, the compound represented by general formula [2] which has been precipitated by crystallization is dissolved into a mixed solvent containing chloroform and toluene again, and the compound represented by general formula [2] is crystallized again from the obtained solution. The purity of the polyoxyalkylene derivative substituted with succinimidyl group is increased by the repeated crystallization. Therefore, the number of repeating of the crystallization can suitably be selected in accordance with the required purity of the polyoxyalkylene derivative substituted with succinimidyl group.

In the process of the present invention, when the polyoxyalkylene derivative substituted with succinimidyl group is crystallized from a solution of the reaction product in a mixed solvent containing chloroform and toluene by addition of an aliphatic hydrocarbon having 5 to 8 carbon atoms, impurities, such as dicyclohexylurea, can be removed more completely to obtain a polyoxyalkylene derivative having a much higher purity than that of a polyoxyalkylene derivative obtained by crystallizing the polyoxyalkylene derivative from a solution of the reaction product in chloroform by addition of an aliphatic hydrocarbon having 5 to 8 carbon atoms.

In the process of the present invention, when the reaction of the compound represented by general formula [1] with N-hydroxysuccinimide is conducted by using chloroform as the solvent for the reaction, the reaction product is generally filtered after the reaction has been completed, and the compound represented by general formula [2] can be crystallized by adding an aliphatic hydrocarbon having 5 to 8 carbon atoms without removing the solvent in advance. When the amount by weight of chloroform in the filtrate is not 0.5 to 10 times as much as the amount by weight of the compound represented by general formula [1], the concentration of the reaction product can suitably be adjusted by removing a portion of the solvent or by adding chloroform.

In the process of the present invention, when the reaction of the compound represented by general formula [1] with N-hydroxysuccinimide is conducted by using toluene as the solvent for the reaction, the reaction product is generally filtered after the reaction has been completed, and after adding chloroform without removing the solvent used for the reaction, the compound represented by general formula [2] can be crystallized by adding an aliphatic hydrocarbon having 5 to 8 carbon atoms to the resultant solution. When the amount by weight of toluene in the filtrate is not 1 to 20 times as much as the amount by weight of the compound represented by general formula [1], the concentration of the reaction product can suitably be adjust by removing a portion of the solvent or by adding toluene.

In the process of the present invention, when the reaction of the compound represented by general formula [1] with N-hydroxysuccinimide is conducted by using a solvent which is different from chloroform or toluene as the solvent for the reaction, the solvent is generally removed after the reaction has been completed. The reaction solution is filtered or not filtered before the solvent for the reaction is removed. Then, the obtained solid product is dissolved in chloroform or toluene. When the reaction solution has not been filtered before the solvent for the reaction was removed, the obtained solution is filtered. When the above solid product is dissolved in chloroform, the obtained solution is used for the crystallization directly or after addition of toluene. When the above solid product is dissolved in toluene, chloroform is added before the solution is used for crystallization. An aliphatic hydrocarbon having 5 to 8 carbon atoms is added to the thus obtained solution to crystallize the compound represented by general formula [2].

To summarize the advantages of the present invention, materials can be handled with safety in the process of the present invention, and a highly pure polyoxyalkylene derivative substituted with succinimidyl group which does not cause turbidity in an aqueous solution because the content of residual dicyclohexylurea is small and has an excellent quality as a material for drugs can be produced.

EXAMPLES

The present invention is described in more detail with reference to examples in the following.

Example 1

In a four-necked flask, 200 g (22.7 mmol) of polyoxyethylene bis(carboxymethyl) ether represented by general formula [3]:

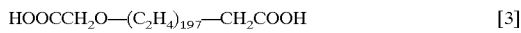

HOOCCH$_2$O—(C$_2$H$_4$O)$_{197}$—CH$_2$COOH   [3]

was dissolved into 400 g of dichloromethane, and the temperature of the resultant solution was kept at 30° C. while the solution was stirred. To this solution, 7.8 g (68.2 mmol) of N-hydroxysuccinimide and 14.0 g (68.2 mmol) of dicyclohexylcarbodiimide were added, and the reaction was allowed to proceed at 30° C. for 15 hours. The reaction solution became turbid as the reaction proceeded.

After the reaction was completed, the solvent was removed from the reaction solution by using a rotary evaporator at 40° C. under 50 mmHg or less in 1 hour, and then 700 g of toluene was added to the resultant product to dissolve the product. After the obtained solution was left standing for 1 hour, the solution was filtered under an increased pressure by using No.5A filter paper (the diameter of retained particles: 7 μm; a product of ADVANTEC Company). To the filtrate, 200 g of chloroform was added to prepare a solution in a mixed solvent. To the obtained solution, 900 g of hexane was slowly added to precipitate crystal. After the resultant mixture was stirred for 1 hour, the formed crystal was separated by the centrifugal filtration at 2,000 rpm for 15 minutes.

The obtained crystal was dissolved into a mixed solvent containing 700 g of toluene and 300 g of chloroform, and crystal was precipitated from the resultant solution by slowly adding 900 g of hexane. After the resultant mixture was stirred for 1 hour, the formed crystal was separated again by the centrifugal filtration at 2,000 rpm for 15 minutes. After this procedure was repeated once more, the crystal was washed with 1,000 g of hexane and separated by the centrifugal filtration at 2,000 rpm for 15 minutes.

The obtained crystal was dried in vacuo at 25° C. for 12 hours to obtain 177 g (the yield: 86.6 %) of an activated polyoxyethylene derivative substituted with succinimidyl group which is expressed by formula [4]:

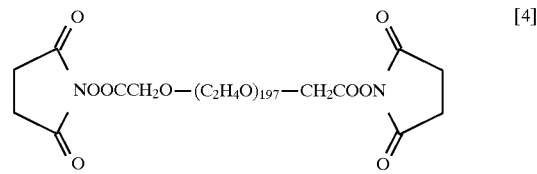

[4]

The degree of activation of the carboxyl group at the end (the fraction of the carboxyl group converted into the imidoester) of the obtained polyoxyethylene derivative was 98.0% as obtained by the measurement of $^1$H-NMR. A 10% by weight aqueous solution of this polyoxyethylene derivative showed a transmittance of light of 650 nm of 97.8%. The $^1$H-NMR spectrum of this polyoxyethylene derivative is shown in FIG. 1. The spectrum in FIG. 1 shows that the content of impurities, such as dicyclohexylurea, in the product was very small.

Example 2

In a four-necked flask, 200 g (20.0 mmol) of polyoxyethylene monomethyl ether monosuccinate represented by general formula [5]:

CH$_3$O—(C$_2$H$_4$O)$_{224}$—COC$_2$H$_4$COOH   [5]

was dissolved into 400 g of dichloromethane, and the temperature of the resultant solution was kept at 30° C. while the solution was stirred. To this solution, 3.5 g (30.0 mmol) of N-hydroxysuccinimide and 6.2 g (30.0 mmol) of dicyclohexylcarbodiimide were added, and the reaction was allowed to proceed at 30° C. for 15 hours. The reaction solution became turbid as the reaction proceeded.

After the reaction was completed, the reaction solution was filtered under an increased pressure by using No.5C filter paper (the diameter of retained particles: 1 μm; a product of ADVANTEC Company). To the filtrate, 800 g of toluene was added to prepare a solution in a mixed solvent. To the obtained solution, 1,200 g of hexane was slowly added to precipitate crystal. After the resultant mixture was stirred for 1 hour, the formed crystal was separated by the centrifugal filtration at 2,000 rpm for 15 minutes.

The obtained crystal was dissolved into a mixed solvent containing 800 g of toluene and 400 g of chloroform, and crystal was precipitated from the resultant solution by slowly adding 1,200 g of hexane. After the resultant mixture was stirred for 1 hour, the formed crystal was separated again by the centrifugal filtration at 2,000 rpm for 15 minutes. After this procedure was repeated once more, the crystal was washed with 1,000 g of hexane and separated by the centrifugal filtration at 2,000 rpm for 15 minutes.

The obtained crystal was dried in vacuo at 25° C. for 12 hours to obtain 180 g (the yield: 89.1%) of an activated polyoxyethylene succinate substituted with succinimidyl group which is expressed by formula [6]:

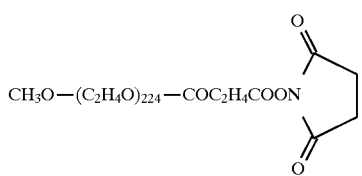

The degree of activation of the carboxyl group at the end of the obtained compound was 97.5% as obtained by the measurement of $^1$H-NMR. A 10% by weight aqueous solution of this polyoxyethylene derivative showed a transmittance of light of 650 nm of 98.2%.

Example 3

In a four-necked flask, 200 g (100.9 mmol) of polyoxyethylene monomethyl monocarboxymethyl ether represented by general formula [7]:

$$CH_3O\text{—}(C_2H_4O)_{43}\text{—}CH_2COOH \qquad [7]$$

was dissolved into 600 g of toluene, and the temperature of the resultant solution was kept at 30° C. while the solution was stirred. To this solution, 17.4 g (151.4 mmol) of N-hydroxysuccinimide and 31.2 g (151.4 mmol) of dicyclohexylcarbodiimide were added, and the reaction was allowed to proceed at 30° C. for 15 hours. The reaction solution became turbid as the reaction proceeded.

After the reaction was completed, the reaction solution was filtered under an increased pressure by using No.5A filter paper (the diameter of retained particles: 7 μm; a product of ADVANTEC Company). To the filtrate, 250 g of chloroform was added to prepare a solution in a mixed solvent. To the obtained solution, 1,000 g of hexane was slowly added to precipitate crystal. After the resultant mixture was stirred for 1 hour, the formed crystal was separated by the centrifugal filtration at 2,000 rpm for 15 minutes.

The obtained crystal was dissolved into a mixed solvent containing 600 g of toluene and 250 g of chloroform, and crystal was precipitated from the resultant solution by slowly adding 1,000 g of hexane. After the resultant mixture was stirred for 1 hour, the formed crystal was separated again by the centrifugal filtration at 2,000 rpm for 15 minutes. After this procedure was repeated once more, the crystal was washed with 1,000 g of hexane and separated by the centrifugal filtration at 2,000 rpm for 15 minutes.

The obtained crystal was dried in vacuo at 25° C. for 12 hours to obtain 171 g (the yield: 81.5%) of an activated polyoxyethylene derivative substituted with succinimidyl group which is expressed by formula [8]:

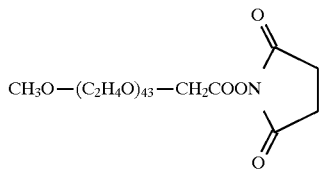

The degree of activation of the carboxyl group at the end of the obtained compound was 99.2% as obtained by the measurement of $^1$H-NMR. A 10% by weight aqueous solution of this polyoxyethylene derivative showed a transmittance of light of 650 nm of 99.0%.

Example 4

In a four-necked flask, 200 g (20.0 mmol) of polyoxyethylenepolyoxypropylene monomethyl ether monosuccinate represented by general formula [9]:

$$CH_3O\text{—}(C_2H_4O)_{205}(C_3H_6O)_{15}\text{—}COC_2H_4COOH \qquad [9]$$

was dissolved into 400 g of chloroform, and the temperature of the resultant solution was kept at 30° C. while the solution was stirred. To this solution, 3.4 g (29.9 mmol) of N-hydroxysuccinimide and 6.2 g (29.9 mmol) of dicyclohexylcarbodiimide were added, and the reaction was allowed to proceed at 30° C. for 15 hours. The reaction solution became turbid as the reaction proceeded.

After the reaction was completed, the reaction solution was filtered under an increased pressure by using No.5C filter paper (the diameter of retained particles: 1 μm; a product of ADVANTEC Company). To the filtrate, 1,500 g of hexane was slowly added to precipitate crystal. After the resultant mixture was stirred for 1 hour, the formed crystal was separated by the centrifugal filtration at 2,000 rpm for 15 minutes.

The obtained crystal was dissolved into 400 g of chloroform, and crystal was precipitated from the resultant solution by slowly adding 1,500 g of hexane. After the resultant mixture was stirred for 1 hour, the formed crystal was separated again by the centrifugal filtration at 2,000 rpm for 15 minutes. After this procedure was repeated once more, the crystal was washed with 1,000 g of hexane and separated by the centrifugal filtration at 2,000 rpm for 15 minutes.

The obtained crystal was dried in vacuo at 25° C. for 12 hours to obtain 183 g (the yield: 90.6%) of an activated polyoxyethylene succinate substituted with succinimidyl group which is expressed by formula [10]:

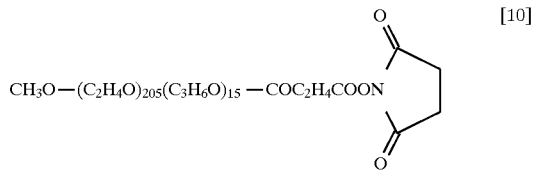

The degree of activation of the carboxyl group at the end of the obtained compound was 96.5% as obtained by the measurement of $^1$H-NMR. A 10% by weight aqueous solution of this polyoxyethylene derivative showed a transmittance of light of 650 nm of 97.5%.

Example 5

In a four-necked flask, 200 g (10.0 mmol) of glycerol polyoxyethylene tris(carboxymethyl ether) represented by general formula [11]:

$$\begin{array}{l}CH_2O\text{—}(C_2H_4O)_{150}\text{—}CH_2COOH \\ | \\ CHO\text{—}(C_2H_4O)_{150}\text{—}CH_2COOH \\ | \\ CH_2O\text{—}(C_2H_4O)_{150}\text{—}CH_2COOH\end{array} \qquad [11]$$

was dissolved into 400 g of dichloromethane, and the temperature of the resultant solution was kept at 30° C. while the solution was stirred. To this solution, 5.2 g (44.9 mmol) of N-hydroxysuccinimide and 9.2 g (44.9 mmol) of dicyclohexylcarbodiimide were added, and the reaction was allowed to proceed at 30° C. for 15 hours. The reaction solution became turbid as the reaction proceeded.

After the reaction was completed, the reaction solution was filtered under an increased pressure by using No.5A filter paper (the diameter of retained particles: 7 μm; a product of ADVANTEC Company). After the solvent was removed from the filtrate by using a rotary evaporator at 40° C. under 50 mmHg or less in 1 hour, 300 g of chloroform was added to dissolve the obtained product. To the obtained solution, 1,000 g of hexane was slowly added to precipitate crystal. After the resultant mixture was stirred for 1 hour, the formed crystal was separated by the centrifugal filtration at 2,000 rpm for 15 minutes.

The obtained crystal was dissolved into 300 g of chloroform, and crystal was precipitated from the resultant solution by slowly adding 1,000 g of hexane. After the resultant mixture was stirred for 1 hour, the formed crystal was separated again by the centrifugal filtration at 2,000 rpm for 15 minutes. After this procedure was repeated once more, the crystal was washed with 1,000 g of hexane and separated by the centrifugal filtration at 2,000 rpm for 15 minutes.

The obtained crystal was dried in vacuo at 25° C. for 12 hours to obtain 181 g (the yield: 89.2%) of an activated polyoxyethylene derivative substituted with succinimidyl group which is expressed by formula [12]:

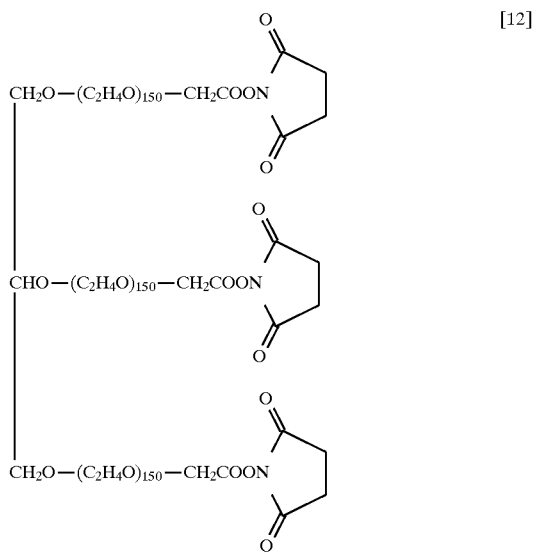

The degree of activation of the carboxyl group at the end of the obtained compound was 95.6% as obtained by the measurement of $^1$H-NMR. A 10% by weight aqueous solution of this polyoxyethylene derivative showed a transmittance of light of 650 nm of 97.7%.

Example 6

In a four-necked flask, 200 g (19.9 mmol) of glycerol polyoxyethylene tris(succinate) represented by general formula [13]:

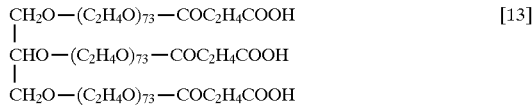

was dissolved into 800 g of toluene, and the temperature of the resultant solution was kept at 30° C. while the solution was stirred. To this solution, 10.3 g (89.7 mmol) of N-hydroxysuccinimide and 18.5 g (89.7 mmol) of dicyclohexylcarbodiimide were added, and the reaction was allowed to proceed at 30° C. for 15 hours. The reaction solution became turbid as the reaction proceeded.

After the reaction was completed, the reaction solution was filtered under an increased pressure by using No.5A filter paper (the diameter of retained particles: 7 μm; a product of ADVANTEC Company). To the filtrate, 250 g of chloroform was added to prepare a solution in a mixed solvent. To the obtained solution, 1,200 g of hexane was slowly added to precipitate crystal. After the resultant mixture was stirred for 1 hour, the formed crystal was separated by the centrifugal filtration at 2,000 rpm for 15 minutes.

The obtained crystal was dissolved into a mixed solvent containing 800 g of toluene and 250 g of chloroform, and crystal was precipitated from the resultant solution by slowly adding 1,200 g of hexane. After the resultant mixture was stirred for 1 hour, the formed crystal was separated again by the centrifugal filtration at 2,000 rpm for 15 minutes. After this procedure was repeated once more, the crystal was washed with 1,000 g of hexane and separated by the centrifugal filtration at 2,000 rpm for 15 minutes.

The obtained crystal was dried in vacuo at 25° C. for 12 hours to obtain 173 g (the yield: 84.1%) of an activated polyoxyethylene tris(succinate) substituted with succinimidyl group which is expressed by formula [14]:

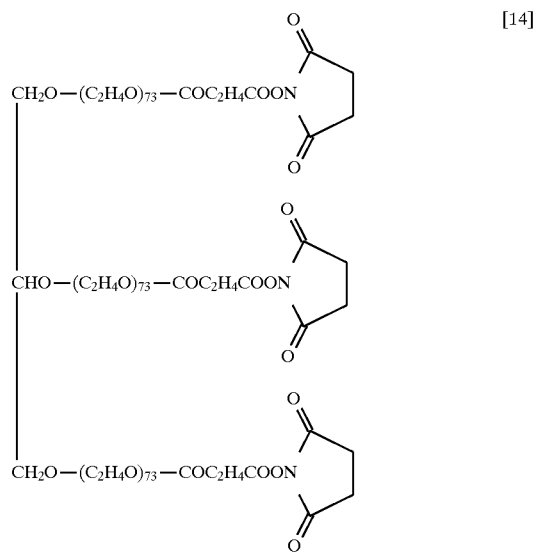

The degree of activation of the carboxyl group at the end of the obtained compound was 95.4% as obtained by the measurement of $^1$H-NMR A 10% by weight aqueous solution of this polyoxyethylene derivative showed a transmittance of light of 650 nm of 98.2%.

Example 7

In a four-necked flask, 200 g (39.9 mmol) of polyoxyethylene monomethyl monocarboxymethyl ether represented by general formula [15]:

was dissolved into 300 g of dichloromethane, and the resultant solution was kept at 30° C. while the solution was stirred. To this solution, 6.9 g (59.8 mmol) of N-hydroxysuccinimide and 12.3 g (59.8 mmol) of dicyclohexylcarbodiimide were added, and the reaction was allowed to proceed at 30° C. for 15 hours. The reaction solution became turbid as the reaction proceeded.

After the reaction was completed, the solvent was removed from the reaction solution by using a rotary evaporator at 40° C. under 50 mmHg or less in 1 hour, and then 700 g of toluene was added to the obtained product to dissolve the product. After the resultant solution was left standing for 1 hour, the solution was filtered under an increased pressure by using No.5A filter paper (the diameter of retained particles: 7 μm; a product of ADVANTEC Company). To the filtrate, 300 g of chloroform was added to prepare a solution in a mixed solvent. To the obtained solution, 1,000 g of heptane was slowly added to precipitate crystal. After the resultant mixture was stirred for 1 hour, the formed crystal was separated by the centrifugal filtration at 2,000 rpm for 15 minutes.

The obtained crystal was dissolved into a mixed solvent containing 700 g of toluene and 300 g of chloroform, and crystal was precipitated from the resultant solution by slowly adding 1,000 g of heptane. After the resultant mixture was stirred for 1 hour, the formed crystal was separated again by the centrifugal filtration at 2,000 rpm for 15 minutes. After this procedure was repeated once more, the crystal was washed with 1,000 g of hexane and separated by the centrifugal filtration at 2,000 rpm for 15 minutes.

The obtained crystal was dried in vacuo at 25° C. for 12 hours to obtain 169 g (the yield: 82.9%) of an activated polyoxyethylene derivative substituted with succinimidyl group which is expressed by formula [16]:

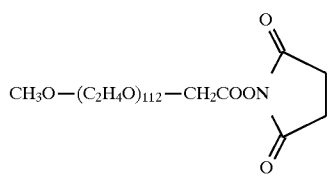

[16]

The degree of activation of the carboxyl group at the end of the obtained compound was 96.4% as obtained by the measurement of $^1$H-NMR. A 10% by weight aqueous solution of this polyoxyethylene derivative showed a transmittance of light of 650 nm of 98.3 S.

Comparative Example 1

In a four-necked flask, 200 g (22.7 mmol) of polyoxyethylene bis(carboxymethyl) ether represented by general formula [3]:

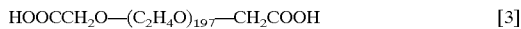

HOOCCH$_2$O—(C$_2$H$_4$O)$_{197}$—CH$_2$COOH    [3]

was dissolved into 600 g of dimethylformamide, and the temperature of the resultant solution was kept at 30° C. while the solution was stirred. To this solution, 7.8 g (68.2 mmol) of N-hydroxysuccinimide and 14.0 g (68.2 mmol) of dicyclohexylcarbodiimide were added, and the reaction was allowed to proceed at 30° C. for 15 hours. The reaction solution became turbid as the reaction proceeded.

After the reaction was completed, the reaction solution was filtered under an increased pressure by using No.5A filter paper (the diameter of retained particles: 7 μm; a product of ADVANTEC Company). To the filtrate, 1,000 g of ethyl ether was slowly added to precipitate crystal. After the resultant mixture was stirred for 1 hour, the formed crystal was separated by the centrifugal filtration at 2,000 rpm for 15 minutes. The obtained crystal was washed with 1,000 g of ethyl ether and separated by the centrifugal filtration at 2,000 rpm for 15 minutes.

The obtained crystal was dried in vacuo at 25° C. for 12 hours to obtain 179 g (the yield: 87.6%) of an activated polyoxyethylene derivative substituted with succinimidyl group which is expressed by formula [4]:

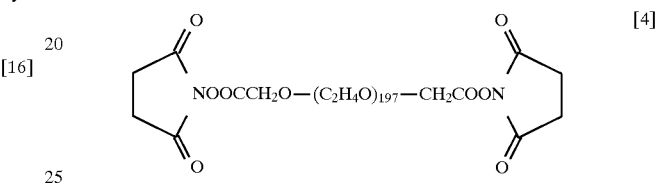

[4]

Figure 2:
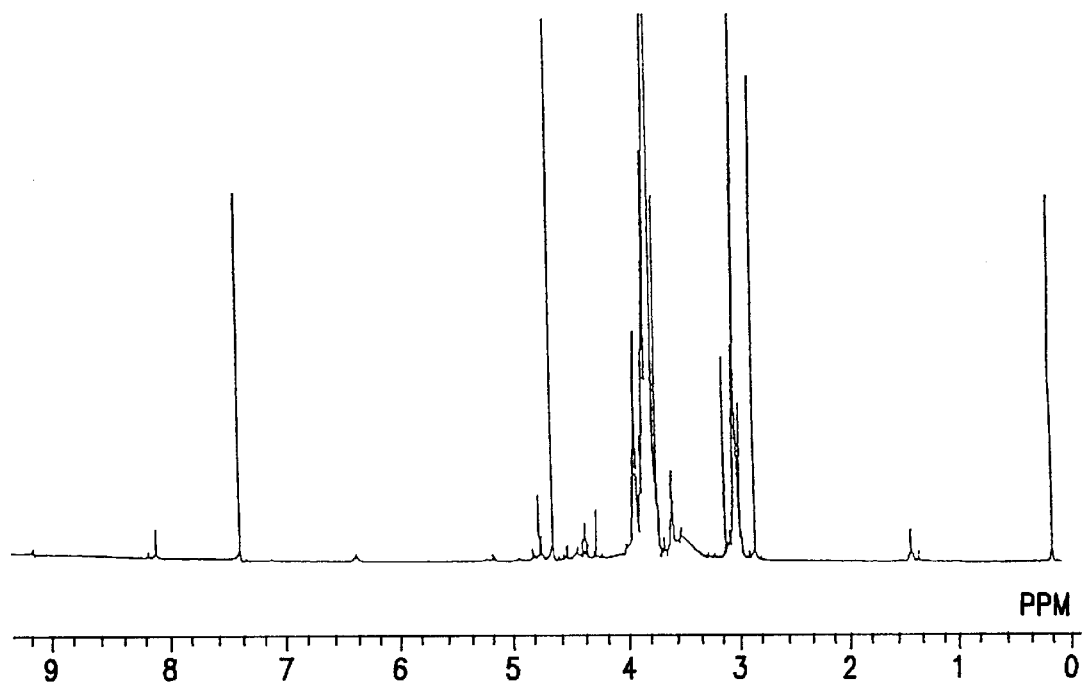
FIG. 2 shows the $^1$H-NMR spectrum of a polyoxyethylene derivative substituted with succinimidyl group which was prepared in accordance with a conventional process.

The degree of activation of the carboxyl group at the end of the obtained compound was 95.6% as obtained by the measurement of $^1$H-NMR. A 10% by weight aqueous solution of this polyoxyethylene derivative showed a transmittance of light of 650 nm of 75.6%. The $^1$H-NMR spectrum of this polyoxyethylene derivative is shown in FIG. 2. Comparison of the spectrum in FIG. 2 with the spectrum in FIG. 1 shows that the activated polyoxyethylene derivative substituted with succinimidyl group which was obtained in Comparative Example 1 contained a large amount of impurities, such as dicyclohexylurea.

The solvent used for the crystallization, the yield of the polyoxyalkylene derivative substituted with succinimidyl group, the degree of activation of the carboxyl group at the end, and the transmittance of light of 650 nm shown by the 10% by weight aqueous solution of the polyoxyethylene derivative in Examples 1 to 7 and Comparative Example 1 are summarized in Table 1.

TABLE 1

|  | solvent and non-solvent used in crystallization*[1] | | | | | degree of | |
|---|---|---|---|---|---|---|---|
|  | toluene | chloroform | hexane*[2] | heptane*[2] | ethyl ether | yield (%) | activation (%) | transmittance (%) |
| Example 1 | 3.5 | 1.5 | 3.0 | — | — | 86.6 | 98.0 | 97.8 |
| Example 2 | 4.0 | 2.0 | 3.0 | — | — | 89.1 | 97.5 | 98.2 |
| Example 3 | 3.0 | 1.25 | 4.0 | — | — | 81.5 | 99.2 | 99.0 |
| Example 4 | — | 2.0 | 3.75 | — | — | 90.6 | 96.5 | 97.5 |
| Example 5 | — | 1.5 | 3.33 | — | — | 89.2 | 95.6 | 97.7 |
| Example 6 | 4.0 | 1.25 | 4.8 | — | — | 84.1 | 95.4 | 98.2 |
| Example 7 | 3.5 | 1.5 | — | 3.33 | — | 82.9 | 96.4 | 98.3 |
| Comparative Example 1 | — | — | — | — | 5.0 | 87.6 | 95.6 | 75.6 |

*[1]: The amount of the solvent or the non-solvent used in the crystallization is shown in terms of the ratio by weight of the amount of the solvent or the non-solvent to the amount of the polyoxyalkylene compound having carboxyl group at the end which was used as the raw material.
*[2]: The amount of hexane or heptane is shown in terms of the ratio by weight of the amount of hexane or heptane to the amount of chloroform.

It can be understood from the results shown in Table 1 that the polyoxyalkylene derivatives substituted with succinimidyl group which were obtained in Examples 1 to 7 in accordance with the process of the present invention had high degrees of activation of the carboxyl group at the end (the fractions of the carboxyl group converted into the imidoester) and contained impurities only in very small amounts as exhibited by the high transmittances of light of 650 nm shown by 10% by weight aqueous solutions. Among the polyoxyethylene derivatives substituted with succinimidyl group obtained in Examples 1 to 7, the polyoxyethylene derivatives substituted with succinimidyl group in Examples 1, 2, 3, 6 and 7 were obtained by the crystallization using mixed solvents containing chloroform and toluene as the good solvent, and the aqueous solutions showed higher transmittances than those of polyoxyethylene derivatives substituted with succinimidyl group in Examples 4 and 5 which were obtained by the crystallization using chloroform alone as the good solvent. This shows that using a mixed solvent containing chloroform and toluene is effective for increasing the purity of the polyoxyalkylene derivative substituted with succinimidyl group. In contrast, the polyoxyalkylene derivative substituted with succinimidyl group in Comparative Example 1 which was obtained by crystallization by adding ethyl ether to the filtrate of the reaction mixture contained impurities in a larger amount than those in the polyoxyalkylene derivatives substituted with succinimidyl group in Examples 1 to 7 as exhibited by the lower transmittance of light of 650 nm shown by 10% by weight aqueous solution of the polyoxyalkylene derivative obtained in Comparative Example 1.

What is claimed is:

1. A process for producing a polyoxyalkylene derivative substituted with succinimidyl group which is represented by general formula [2]:

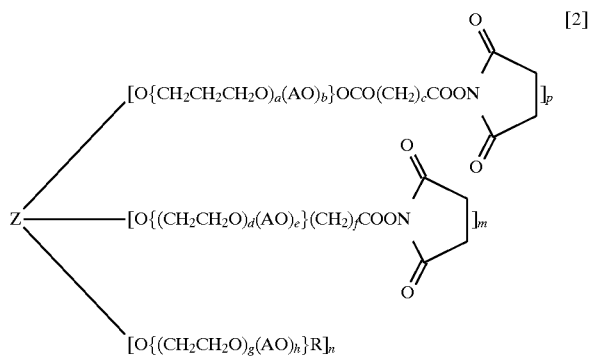

(wherein Z represents a residue derived from a compound having 2 to 4 hydroxyl groups; R represents hydrogen atom or a hydrocarbon group having 1 to 24 carbon atoms; AO represents an oxyalkylene group having 3 or 4 carbon atoms; a, d and g represent each an average number by mol of addition of oxyethylene group which is 0 to 1,000, and a+d+g=30 to 1,000; b, e, and h represent each an average number by mol of addition of oxyalkylene group which is 0 to 200; (b+e+h)/(a+d+g)=0 to 0.2; the oxyethylene groups and the oxyalkylene groups are added to each other randomly or to form blocks; c represents 1 to 4; f represents 1 to 3; p represents 0 to 4; m represents 0 to 4; n represents 0 to 3; p and m do not simultaneously represent 0; and p+m+n=2 to 4) which comprises:

reacting a polyoxyalkylene compound having carboxyl group at ends which is represented by general formula [1]:

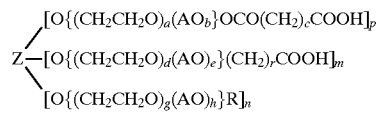

(wherein Z represents a residue derived from a compound having 2 to 4 hydroxyl groups; R represents hydrogen atom or a hydrocarbon group having 1 to 24 carbon atoms; AO represents an oxyalkylene group having 3 or 4 carbon atoms; a, d and g represent each an average number by mol of addition of oxyethylene group which is 0 to 1,000, and a+d+g=30 to 1,000; b, e, and h represent each an average number by mol of addition of oxyalkylene group which is 0 to 200; (b+e+h)/(a+d+g)=0 to 0.2; the oxyethylene groups and the oxyalkylene groups are added to each other randomly or to form blocks; c represents 1 to 4; f represents 1 to 3; p represents 0 to 4; m represents 0 to 4; n represents 0 to 3; p and m do not simultaneously represent 0; and p+m+n=2 to 4) with N-hydroxysuccinimide in an inert solvent in the presence of dicyclohexylcarbodiimide to obtain a reaction product;

dissolving the obtained reaction product into chloroform, an amount by weight of chloroform being 0.5 to 10 times as much as an amount by weight of the compound represented by general formula [1]; and crystallizing the compound represented by general formula [2] by adding an aliphatic hydrocarbon having 5 to 8 carbon atoms to a resultant solution, an amount by weight of the aliphatic hydrocarbon being 2 to 10 times as much as an amount by weight of chloroform.

2. A process according to claim 1, wherein the obtained reaction product is dissolved into a mixed solvent comprising chloroform and toluene, an amount by weight of chloroform being 0.5 to 10 times as much as an amount by weight of the compound represented by general formula [1], and an amount by weight of toluene being 1 to 20 times as much as an amount by weight of the compound represented by general formula [1]; and the compound represented by general formula [2] is crystallized by adding an aliphatic hydrocarbon having 5 to 8 carbon atoms to a resultant solution, an amount by weight of the aliphatic hydrocarbon being 2 to 10 times as much as an amount by weight of chloroform.

3. A process according to claim 1, wherein the obtained reaction product is dissolved into chloroform, an amount by weight of chloroform being 1 to 3 times as much as an amount by weight of the compound represented by general formula [1]; and the compound represented by general formula [2] is crystallized by adding hexane or heptane to a resultant solution, an amount by weight of hexane or heptane being 2.5 to 5 times as much as an amount by weight of chloroform.

4. A process according to claim 2, wherein the obtained reaction product is dissolved into a mixed solvent comprising chloroform and toluene, an amount by weight of chloroform being 1 to 3 times as much as an amount by weight of the compound represented by general formula [1], and an amount by weight of toluene being 2 to 5 times as much as an amount by weight of the compound represented by general formula [1]; and the compound represented by general formula [2] is crystallized by adding hexane or heptane to a resultant solution, the amount by weight of hexane or heptane being 2.5 to 5 times as much as an amount by weight of chloroform.

* * * * *